Sept. 29, 1942. D. W. HEAD 2,297,102
LOCK NUT
Filed Oct. 17, 1940
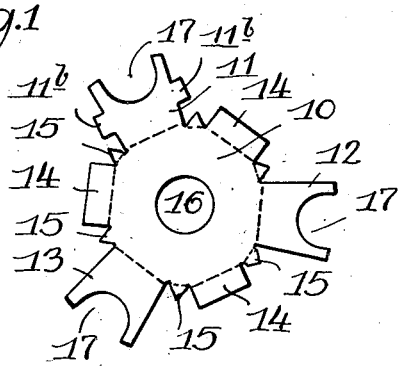
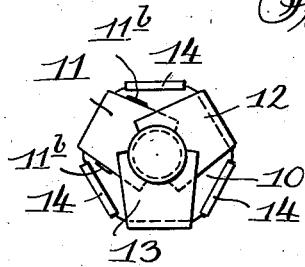
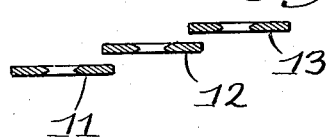
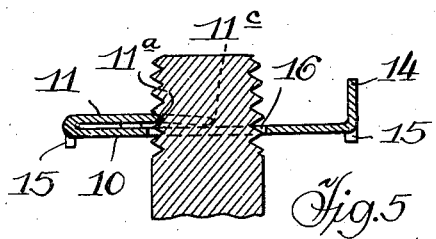
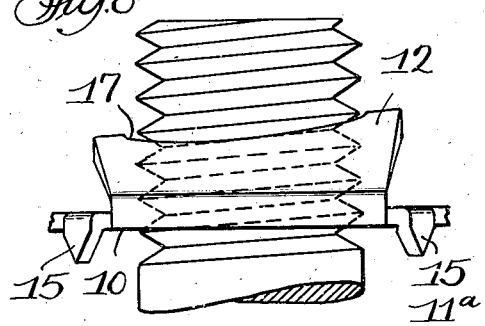
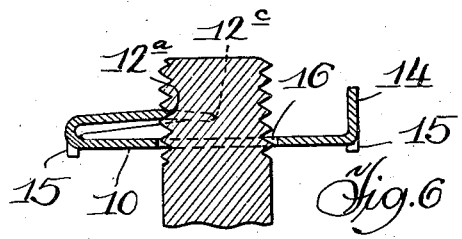
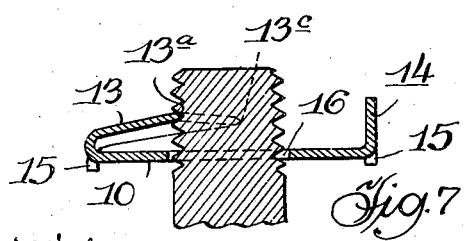
INVENTOR.
Drew W. Head
BY
Sheridan Davis and Cargill
ATTORNEYS
Witness:
Chas. R. Koursh.

Patented Sept. 29, 1942

2,297,102

UNITED STATES PATENT OFFICE 2,297,102

LOCK NUT

Drew W. Head, Chicago, Ill.

Application October 17, 1940, Serial No. 361,497

1 Claim. (Cl. 85—36)

One of the objects of the invention is to provide a lock nut that can be formed of sheet metal on a punch press and of such construction that it may be given a hexagonal shape and thus turned into position on a bolt by a conventional hexagonal socket wrench. Lock nuts of sheet metal have heretofore been constructed by punch press operations but not of hexagonal shape and, insofar as I am aware, they have been provided with thread-engaging means or thread followers which engaged the bolt threads through an arc of less than 360 degrees and, consequently, have not provided the strength required in resisting stresses in numerous instances where they could have been used to advantage.

Another object of the invention therefore is to provide a lock nut which has means for engaging bolt threads through greater arcs than the prior art nuts mentioned. In fact, in the preferred embodiment of the improved nut described more fully hereinafter, the thread followers engage the bolt threads through an arc of approximately 540 degrees, which represents about a 50 per cent increase in thrust resisting capacity, other things being equal, over the prior art sheet metal lock nuts referred to above.

Another object of the invention is to provide a lock nut having flexible thread followers which are so angularly disposed originally that as they are compressed or forced toward the nut base as the latter begins to seat on a work piece the thread-engaging portions of the followers are pressed more firmly or deeply into the thread groove and into engagement with the body of the bolt and hence the nut, when screwed down into final position, firmly resists retrograde movement of the same with respect to the bolt; in fact, the nut is locked to the bolt.

A further object of the invention is to provide a sheet metal lock nut provided with a base preferably having a plurality of work piece engaging members or spurs at its periphery, which periphery is stiffened whereby deflection of the base is resisted and the full axial thrust of the nut as it is turned into final position is utilized in forcing the spurs into such engagement with the work piece as to lock the nut against reverse movement. The preferred construction thus embodies features whereby the nut not only is locked to the bolt but to the work piece as well.

Another object of the invention is to provide a nut having flexible thread followers which are placed under tension as the nut is turned to final position on a screw or bolt and by means of their flexibility are adapted to compensate for any elongation of the bolt that occurs due to stretching of the bolt under the stresses imposed thereon, or by reason of expansion due to temperature changes.

Other objects of the invention relate to various features of construction and arrangement of parts which will be apparent from a consideration of the following specification and accompanying drawing, wherein Figure 1 is a plan view of the blank of which a hexagonal base nut embodying the present improvement is formed;

Figure 2 is a top plan view of the completed nut formed from the blank shown in Figure 1;

Figure 3 is a bottom plan view of the nut shown in Figure 2;

Figure 4 is a perspective view of the nut shown in Figure 2 and illustrating the overlapping or semi-superposed relation of the three thread followers;

Figure 5 is a sectional view taken longitudinally through the lower of the three thread followers and in full lines showing the same in compressed position, as when the nut has been screwed down to final position;

Figure 6 is a similar view through the second or intermediate thread follower;

Figure 7 is a similar view through the upper thread follower;

Figure 8 is an enlarged broken elevation illustrating the disposition of the thread engaging portion of a thread follower in parallelism with the helix angle of the thread of an engaged screw or bolt;

Figure 9 is an enlarged broken sectional view through the lower of the thread followers, showing in dotted lines the original angular position of the follower, and in full lines the position thereof after the nut has been fully seated on the work piece; and Figure 10 is a diagrammatic illustration showing the vertically staggered and semi-superposed relation of the thread followers.

In the drawing, 10 indicates the base of the improved nut and in the embodiment shown is of hexagonal configuration. The blank of which the nut is formed, as shown in Figure 1, is provided with three thread engaging members or thread followers 11, 12 and 13, and three identical lugs 14, each disposed between adjacent followers, and six spurs or work-piece engaging members 15. The base 10 of the nut is centrally apertured at 16 for freely receiving a bolt or screw on which the nut is to be screwed.

In forming the improved nut from a blank illustrated in Figure 1, the members 14 are turned upwardly to vertical position while members 15 are turned downward through a suitable angle, for example, an angle of approximately 90 degrees, whereby the apices thereof are disposed below the plane of the lower surface of the base 10.

The followers 11, 12 and 13 are generally similar but vary slightly in original length to compensate for different angular positions finally accorded to them. The members 11 to 13, in the form as shown, are provided with longitudinal diverging edges, the inner or free ends each being provided with semi-circular recesses 17 of a radius predetermined by the minor diameter of the bolt with which the nut is to be used. The arcs of the recesses 17 are of approximately 180 degrees and the arcuate edges preferably are beveled from each side of the follower as by swaging, as illustrated in Figures 5 to 7, especially in nuts of a size requiring the use of stock of a thickness approaching the pitch of the bolt thread, so as to conform the thread-engaging portions of the followers substantially to the cross-sectional shape of the thread groove, that is, to the angle of thread, into which groove said edges seat as the nut is screwed onto a bolt or screw. This swaging is not essential where the stock is relatively thin as compared with the pitch of the bolt thread with which the nut is to be employed.

Followers 11 to 13, as stated, are of different original length, that of the lower follower 11 being the shortest, and the length of followers 12 to 13 being progressively greater as is required in giving the followers different angular positions but at the same time causing the arcuate thread-engaging edges thereof to be disposed uniformly from the axis of the opening 16 and thus so disposed as uniformly to engage the threads of a bolt passed through said opening.

The followers 11 to 13 are folded upwardly and over the base 10, follower 11 being the shortest, having a slightly sharper fold than the others. Follower 12 is folded to partially overlie follower 11, while follower 13 is folded to partially overlie follower 12 as illustrated in Figures 2, 4 and 10. The followers have their respective thread-engaging edges 11a, 12a and 13a disposed at an angle corresponding to the helix angle of the bolt thread. These thread-engaging edges are spaced apart vertically also such distances as to dispose them in positions for engaging within the groove of a bolt thread upon which the nut is turned, notwithstanding the overlapping of semi-superposed relation of the ends. Preferably the edges 11a, 12a and 13a of the followers engage within the grooves of successive convolutions or turns of the bolt thread. The followers engage a thread through a total arc of approximately 540 degrees. Due to the helical disposition of the free ends of the followers 11 to 13, the corner portions of each free end are at different elevations from the base 10. The lower corner portion 11b of the lowermost follower 11 is spaced above the lower surface of the base 10, as shown in dotted lines in Figure 5, while the lower portion or corner 12b of the intermediate follower 12 overlies the higher corner portion 11c of follower 11. The lower corner portion 13b of the outer end of the upper follower 13 overlies the higher outer corner portion 12c of the follower 12. This vertical staggering and overlying relation of the thread engaging ends of the follower members enable the nut to engage the bolt thread through a total arc of approximately 540 degrees, although the individual edges 11a, 12a and 13a engage individual thread arcs of only 180 degrees.

As the nut is screwed down on a bolt into engagement with a work-piece such as is illustrated at 18 in Figure 9, the spurs 15 first engage the work-piece and as the nut is screwed into final position the spurs will generally bite into the work and thus tend to lock the nut against retrograde movement. Such locking effect is better produced by turning the screw while the nut is held stationary by a wrench since the spurs will then be forced directly into the work-piece. As the screw or bolt is turned, as stated, the base will be arrested in its movement axially of the bolt upon contact with the work-piece. Turning the nut relative to the bolt thereafter causes the flexible followers to flex toward the base and thus provide spring tension which tends to retain the nut against loosening action and compensates for elongation of the bolt due to stretching or temperature changes. Such downward deflection of the followers 11 to 13 is arrested, however, when lugs or stop members 11b integral with the longitudinal edges of the follower 11 firmly contacts the base 10.

During the flexing movement of the members 11 to 13 from their original inclined positions, illustrated by dotted lines in Figures 5 to 7, in which they freely engage the threads of a bolt, to their final positions wherein they have approached horizontal positions, the thread-engaging portions 11a, 12a and 13a of the followers tend to move inwardly with respect to the thread groove. Such inward movement of the thread-engaging ends 11a, 12a and 13a cause them firmly to engage the body or shank of the bolt at the base or root of the thread as the nut is moved to final position and hence said ends lock the nut to the bolt and resist relative movement of each with respect to the other.

It will also be observed that the perimeter of the base is stiffened or reinforced by the vertical tongues or lugs 14 and by the upwardly extending rear or folded portions of the members 11, 12 and 13. Hence, as the nut is turned to final position on a work-piece practically the total axial thrust of the nut as it approaches final position is imposed on the spurs 15 which are forced to dig into the work-piece and lock the nut thereto. Thus, through the nut as an intermediary, the bolt is locked to the work piece inasmuch as the nut is locked to both the bolt and the work-piece.

The improved nut, while constructed of sheet metal and hardened and tempered after formation, provides means for engaging the thread of a bolt or screw through more than 360 degrees of arc by reason of the provision of the three partially or semi-superposed thread followers, each having an arcuate thread-engaging portion of approximately 180 degrees. The nut disclosed is given a hexagonal shape in plan view whereby a conventional hexagonal socket wrench can be employed in turning the nut into position, although it will be obvious that by providing a nut of octagonal shape at least four thread-engaging members can be provided and the ability of the nut to resist stripping thereby relatively increased. For small size nuts, however, the hexagonal shaped nut provided with only three thread followers is satisfactory, but it will be obvious that by employing the principle of superposing the thread followers as disclosed herein a sheet metal nut can be formed having a greater number of followers, where desirable. By arresting the movement of the followers toward the base, as by the lug 11b, at positions wherein the followers do not pass beyond horizontal positions, their maximum locking engagement with the bolt is utilized for resisting relative retrograde or loosening movement.

While I have described a preferred embodiment of my invention, many modifications may be made without departing from the spirit of the invention, and I do not wish to be limited to the precise details of construction set forth, but desire to avail myself of all changes within the scope of the appended claim.

I claim:

A sheet metal nut comprising a base provided with a bolt-receiving aperture and a plurality of angularly disposed thread followers extending inwardly from the perimeter of the base at different acute angles with respect thereto and terminating in arcuate thread-engaging portions disposed in partially overlapping relation for threadedly engaging through an arc of more than 360 degrees the thread of a bolt passed through said aperture, the angular positions of said followers being such as to cause said arcuate portions to move inwardly toward the root of the thread as said followers are flexed toward said base, and means carried by the lower of said followers for abutting said base for arresting such movement of the followers toward said base at positions wherein said followers exert maximum locking action on the bolt.

DREW W. HEAD.